(12) United States Patent
Shibayama et al.

(10) Patent No.: US 8,366,577 B2
(45) Date of Patent: Feb. 5, 2013

(54) POWER TRANSMISSION DEVICE

(75) Inventors: Yoshinori Shibayama, Anjo (JP); Ko Tsunematsu, Kariya (JP); Tomoyuki Ishikawa, Anjo (JP); Tatsuaki Ito, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 181 days.

(21) Appl. No.: 13/042,896

(22) Filed: Mar. 8, 2011

(65) Prior Publication Data

US 2011/0245009 A1 Oct. 6, 2011

(30) Foreign Application Priority Data

Mar. 31, 2010 (JP) ................................. 2010-082491

(51) Int. Cl.
*F16H 57/04* (2010.01)
(52) U.S. Cl. ...................................................... 475/159
(58) Field of Classification Search .................... 475/159
See application file for complete search history.

(56) References Cited

U.S. PATENT DOCUMENTS

| | | | | |
|---|---|---|---|---|
| 4,429,587 A | * | 2/1984 | Finn et al. ......................... | 74/467 |
| 4,656,885 A | * | 4/1987 | Hori et al. ........................ | 74/467 |
| 4,658,665 A | * | 4/1987 | Strinzel et al. .................. | 74/467 |
| 2007/0066440 A1 | | 3/2007 | Kitahara et al. | |

FOREIGN PATENT DOCUMENTS

| | | |
|---|---|---|
| JP | 63-053068 U | 4/1988 |
| JP | 6-016760 U | 3/1994 |
| JP | 2009-250422 A | 10/2009 |

OTHER PUBLICATIONS

International Search Report (ISR) for corresponding International Patent Application No. PCT/JP2011/054360 mailed Apr. 5, 2011.

\* cited by examiner

*Primary Examiner* — Dirk Wright
(74) *Attorney, Agent, or Firm* — Sughrue Mion, PLLC

(57) ABSTRACT

A vehicle power transmission device including an accumulation portion which accumulates lubricating oil, a pressure pump driven to pump the lubricating oil accumulated in the accumulation portion to the transmission as hydraulic oil, a scooping gear which scoops up the lubricating oil accumulated in the accumulation portion while rotating, a reception and guide portion receiving the lubricating oil scooped up by the scooping gear and guiding it to a predetermined lubrication target, and a leaked hydraulic oil guide portion guiding leaked hydraulic oil, leaked when the hydraulic oil is pumped from the pressure pump, to the reception and guide portion.

12 Claims, 5 Drawing Sheets

POWER TRANSMISSION DEVICE

INCORPORATION BY REFERENCE

The disclosure of Japanese Patent Application No. 2010-082491 filed on Mar. 31, 2010, including the specification, drawings and abstract thereof, is incorporated herein by reference in its entirety.

BACKGROUND OF THE INVENTION

1. Field of the Invention

The present invention relates to a power transmission device.

2. Description of the Related Art

Heretofore, as this kind of power transmission device, one which includes a differential ring gear which rotates and thereby scoops up lubricating oil accumulated in a bottom portion in a transmission case, a catch tank which, as well as temporarily accumulating the lubricating oil, causes it to flow downward and supplies it to a counter drive gear and the like, a fluid introduction passage which introduces the lubricating oil scooped up by a differential ring gear disposed on an upper side in the case and supplies it to a lubrication and cooling pathway and the catch tank in the case, and an oil pump which is driven by a drive motor to supply the lubricating oil to each sliding and rolling portion in the case, has been proposed (for example, refer to JP-A-2009-250422). With this device, a lubrication of each lubrication target is carried out using the lubricating oil scooped up by the differential ring gear and the lubricating oil supplied by the oil pump.

Also, a power transmission device which includes an oil pump which, being mounted between a pump housing and a pump cover which demarcates a first housing chamber housing a torque converter and a second housing chamber housing a planetary gear train of a transmission, supplies lubricating oil to the torque converter and the like as hydraulic oil, wherein a lubricating oil passage is formed in the pump housing, a lubricating oil supply port passing through the cover is formed in a position in the pump cover aligned with the lubricating oil passage, and a communication groove, which allows communication between the lubricating oil supply port and the clutch plate side of brakes which selectively fix rotational elements of the planetary gear train, is formed on a perimeter of the lubricating oil supply port, has also been proposed (for example, refer to JP-A-2007-85409). With the device, most of the oil is introduced into an oil passage connecting with the torque converter side, but one portion of the oil is drained to the lubricating oil passage and flows to the clutch plate side via the lubricating oil passage, lubricating oil supply port, and communication groove, thereby carrying out a lubrication of this clutch plate and the like.

SUMMARY OF THE INVENTION

With the former power transmission device and a configuration that, as well as including a hydraulic transmission in addition to the former power transmission device, includes the oil pump of the latter device (an oil pump which, as well as pumping the hydraulic oil (lubricating oil) for operating the transmission, drains one portion of the lubricating oil and supplies it for lubrication) in place of the oil pump of the former device (an oil pump which pumps the lubricating oil for lubrication), when the lubricating oil pumped by the oil pump is large in amount, the lubricating oil scooped up by the differential ring gear decreases because the amount of lubricating oil accumulated in the case bottom portion decreases, and when the lubricating oil pumped by the oil pump is small in amount, the lubricating oil supplied from the oil pump for lubrication decreases. For this reason, a case in which a sufficient lubrication cannot be carried out with only the lubricating oil from one of these occurs depending on a member (a lubrication target).

The power transmission device of the invention has a main object of preventing lubricating oil supplied to a predetermined lubrication target from running short.

The power transmission device of the invention adopts the following mechanism in order to achieve the heretofore described main object.

The gist of the power transmission device of the invention, being a power transmission device which, as well as being mounted in a vehicle, is housed in a casing, and includes a hydraulic transmission which transmits power from a motor to an axle, is that it includes:

an accumulation portion which accumulates lubricating oil;

a pressure pump which is driven by the motor to pump the lubricating oil accumulated in the accumulation portion to the transmission as hydraulic oil of the transmission;

a scooping gear which scoops up the lubricating oil accumulated in the accumulation portion while rotating;

a reception and guide portion which receives the lubricating oil scooped up by the scooping gear and guides it to a predetermined lubrication target; and a leaked hydraulic oil guide portion which guides leaked hydraulic oil, leaking when the hydraulic oil is pumped from the pressure pump, to the reception and guide portion.

The power transmission device of the invention includes the scooping gear which scoops up the lubricating oil accumulated in the accumulation portion while rotating, the reception and guide portion which receives the lubricating oil scooped up by the scooping gear and guides it to the predetermined lubrication target, and the leaked hydraulic oil guide portion which guides the leaked hydraulic oil, leaking when the hydraulic oil is pumped from the pressure pump, to the reception and guide portion. Consequently, the lubricating oil scooped up by the scooping gear and the lubricating oil discharged from the pressure pump and guided by the leaked hydraulic oil guide portion are once gathered in the reception and guide portion, and guided to the predetermined lubrication target, meaning that it is possible to prevent the lubricating oil supplied to the predetermined lubrication target from running short even when either the lubricating oil scooped up by the scooping gear or the lubricating oil discharged from the pressure pump and guided by the leaked hydraulic oil guide portion is small in amount. Also, it is also possible to simplify the reception and guide portion in comparison with an arrangement wherein guide portions which guide the lubricating oil to the predetermined lubrication target are provided one for each of the lubricating oil scooped up by the scooping gear and the lubricating oil discharged from the pressure pump and guided by the leaked hydraulic oil guide portion.

With the thus configured power transmission device of the invention, an arrangement can be such that a place of the reception and guide portion differing from a place which guides the leaked hydraulic oil to the predetermined target opens into the atmosphere. By so doing, when the lubricating oil gathered in the reception and guide portion is large in amount, one portion of the lubricating oil spills from the place opening into the atmosphere, meaning that it is possible to prevent excess lubricating oil from being supplied to the predetermined lubrication target.

Also, with the power transmission device of the invention, an arrangement can be such that the reception and guide portion has a main body which temporarily accumulates the lubricating oil, an introduction portion which introduces the lubricating oil scooped up by the scooping gear to the main body, and a lubrication guide portion which guides the lubricating oil of the main body to the predetermined lubrication target. In this case, it is possible to achieve a further reduction in size of the main body.

With the power transmission device of the aspect of the invention wherein the reception and guide portion has the main body, introduction portion, and lubricating guide portion, an arrangement can also be such that the introduction portion is formed in such a way as to decline toward the main body side.

Also, with the power transmission device of the aspect of the invention wherein the reception and guide portion has the main body, introduction portion, and lubricating guide portion, an arrangement can be such that a shield is disposed between the scooping gear and predetermined lubrication target. In this case, it is difficult to directly supply the lubricating oil scooped up by the scooping gear to the predetermined lubrication target, meaning that it is significant to provide the reception and guide portion. With the power transmission device of the aspect of the invention, an arrangement can be such that the shield is a counter driven gear which, being attached to a counter shaft, meshes with a counter drive gear attached to an output shaft of the transmission, the scooping gear is a differential ring gear which, as well as meshing with a differential pinion gear attached to the counter shaft, is linked to a differential mechanism connected to the axle, and the predetermined lubrication target is a bearing which rotatably supports the counter shaft. With the power transmission device of the aspect of the invention, an arrangement can also be such that the main body is disposed on the side opposite to the differential ring gear across the counter driven gear, and the lubrication guide portion is formed along an inner wall surface of the casing.

DETAILED DESCRIPTION OF THE EMBODIMENTS

Next, a description will be given, using an embodiment, of a best mode for carrying out the invention.

Figure 1:
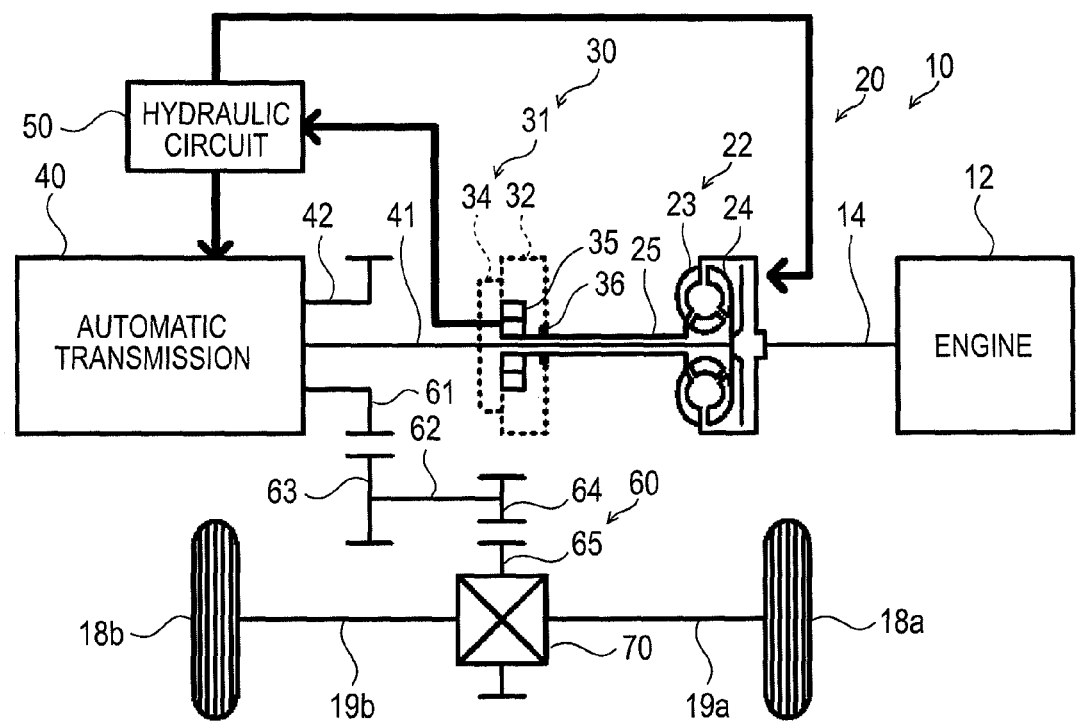
FIG. 1 is a configuration diagram showing an outline of a configuration of a power transmission device 20 as one embodiment of the invention.

FIG. 1 is a configuration diagram showing an outline of a configuration of a power transmission device 20 as one embodiment of the invention. The power transmission device 20 of the embodiment is configured as a transaxle device which, being mounted on an automobile 10, changes the speed of power from an engine 12 and transmits the power to left and right front wheels 18a and 18b, and as shown in the drawing, includes a lockup clutch equipped torque converter 22 which has an input side pump impeller 23 connected to a crankshaft 14 of the engine 12 and an output side turbine runner 24, an oil pump 30 which, being disposed in the subsequent stage of the torque converter 22, is driven by the engine 12 to pump hydraulic oil (lubricating oil), a hydraulic multistage automatic transmission 40 which, having an input shaft 41 connected to the turbine runner 24 of the torque converter 22 and an output shaft 42, changes the speed of the power input into the input shaft 41 and outputs the power to the output shaft 42, a hydraulic circuit 50 which receives a supply of the hydraulic oil from the oil pump 30 and supplies the hydraulic oil to the torque converter 22 (lockup clutch) or the automatic transmission 40 (clutches and brakes) as necessary, a gear mechanism 60 which, as well as being connected to the output shaft 42 of the automatic transmission 40, is connected via a differential mechanism (a differential gear) 70 to axles 19a and 19b linked to the front wheels 18a and 18b, and a casing (refer to FIG. 2) which houses these.

Figure 2:
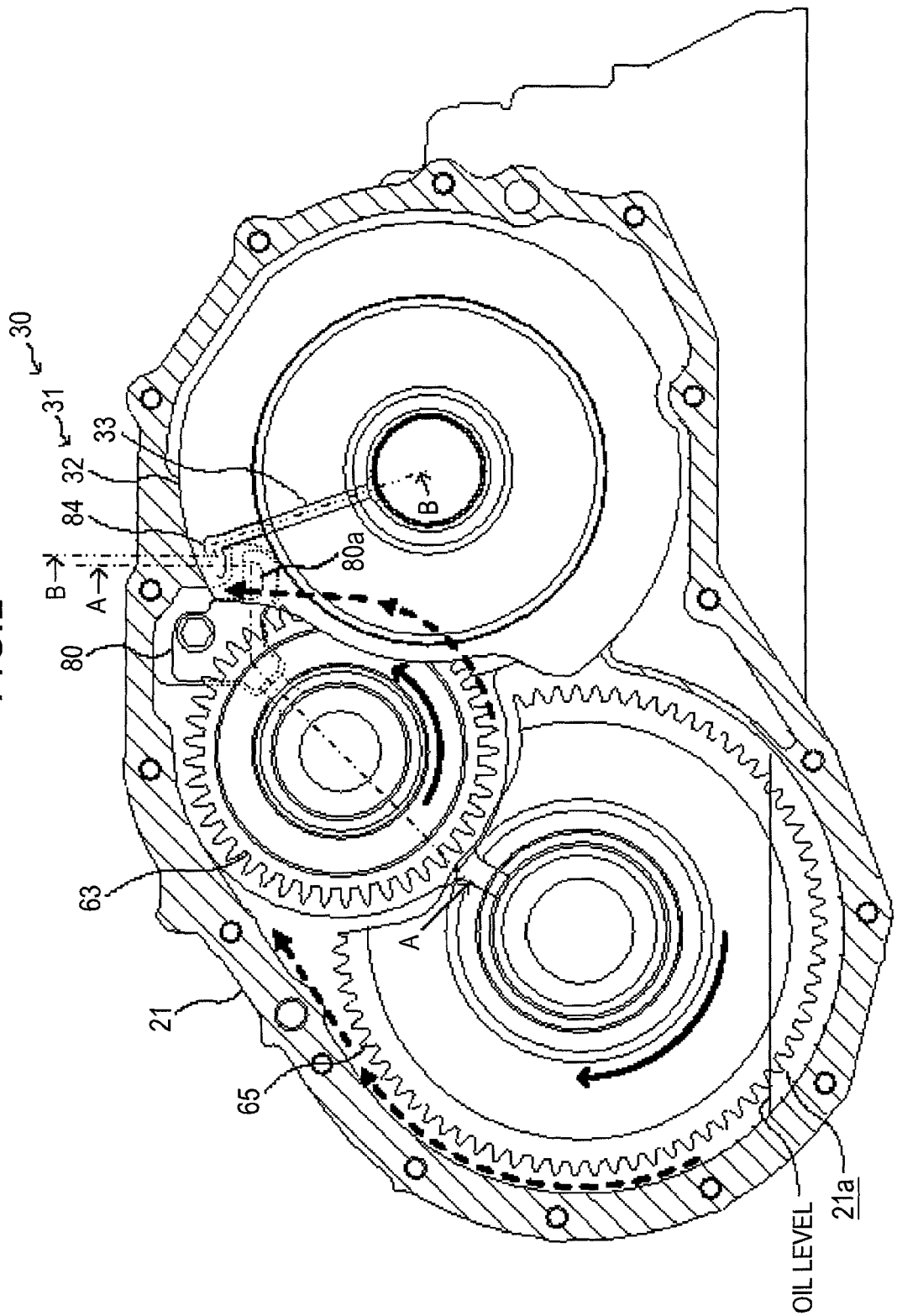
FIG. 2 is an illustration showing a condition of a disposition in a casing 21.
Figure 4:
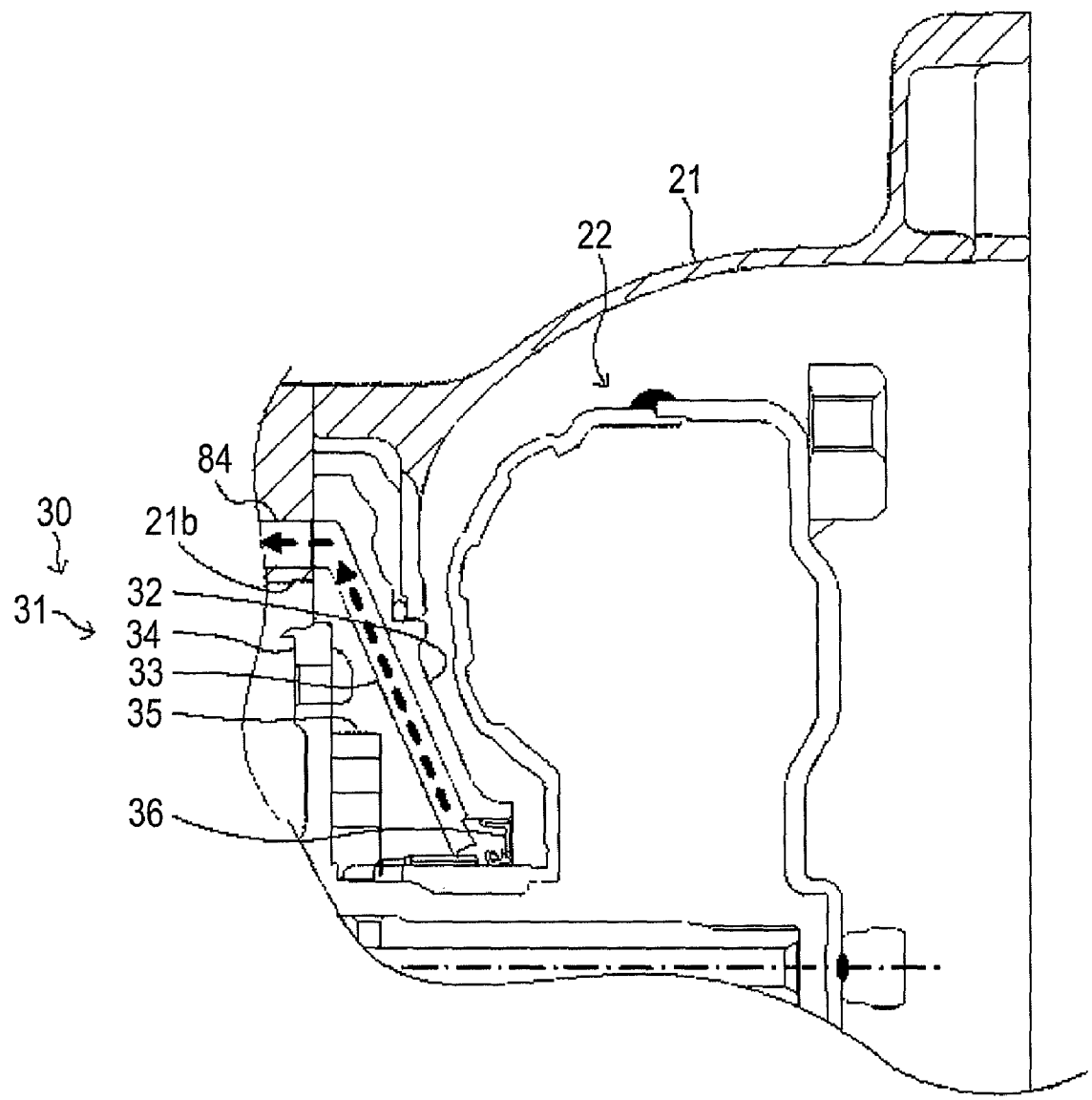
FIG. 4 is a fragmentary sectional view showing a B-B partial cross-section of FIG. 2.

The oil pump 30 is configured as a so-called gear pump having a pump assembly 31 formed of a pump body 32 fixed to the casing 21 (refer to FIG. 2) and a pump cover 34, and an externally toothed gear 35 disposed in the pump assembly 31. Herein, the externally toothed gear 35, being connected to the pump impeller 23 via a hub 25, forms a crescent together with unshown internal teeth formed on the pump body 32. Also, a discharge oil passage 33 (refer to FIGS. 2 and 4) which discharges the lubricating oil is formed in the pump body 32. The outer periphery of the hub 25 and the inner periphery of the pump body 32 are sealed with an oil seal 36, preventing a leakage of the lubricating oil (a discharge of the lubricating oil from other than the discharge oil passage 33). The thus configured oil pump 30, on the externally toothed gear 35 rotating with the power from the engine 12, suctions the lubricating oil accumulated in the bottom portion (hereafter referred to as an accumulation portion 21a) of the casing 21 and, as well as pumping most of the lubricating oil to an oil passage (not shown) connecting with the hydraulic circuit 50 as the hydraulic oil of the hydraulic circuit 50, discharges one portion (leaked hydraulic oil leaking from the oil passage connecting with the hydraulic circuit 50) of the lubricating oil through the discharge oil passage 33 via the lubrication of the oil seal 36. In the examples of FIGS. 2 and 4, the discharge oil passage 33 is formed in such a way that the lubricating oil moves obliquely upward and is discharged, but as the lubricating oil is pumped by the externally toothed gear 35 rotating, it is possible to discharge the leaked hydraulic oil through the discharge oil passage 33.

The automatic transmission 40 is configured as a four-staged transmission which can switch between forward first to fourth speeds, reverse, and neutral by changing an engagement condition (the activation or deactivation) of the plurality of clutches and brakes. Herein, the activation or deactivation of the clutches and brakes is carried out by an oil pressure caused to act on the clutches and brakes being adjusted by the operation of the hydraulic circuit 50.

The gear mechanism 60 includes a counter drive gear 61 attached to the output shaft 42 of the automatic transmission 40, a counter driven gear 63 which, being attached to a counter shaft 62 disposed parallel to the output shaft 42, meshes with the counter drive gear 61, a differential pinion gear (a final drive gear) 64 attached to the same counter shaft 62, and a differential ring gear (a final driven gear) 65 which, as well as meshing with the differential pinion gear 64, is linked to the differential mechanism (differential gear) 70.

The differential mechanism 70, being configured as a known differential gear, includes a differential case 71 which, being rotatably supported in the casing 21, is linked to the differential ring gear 65, an unshown pair of pinion mate gears (bevel gears) fixed to a shaft rotatably supported on the differential case 71, and an unshown pair of side gears meshing one with either pinion mate gear, and the axles 19a and 19b linked to the front wheels 18a and 18b are connected one to either side gear.

Figure 3:
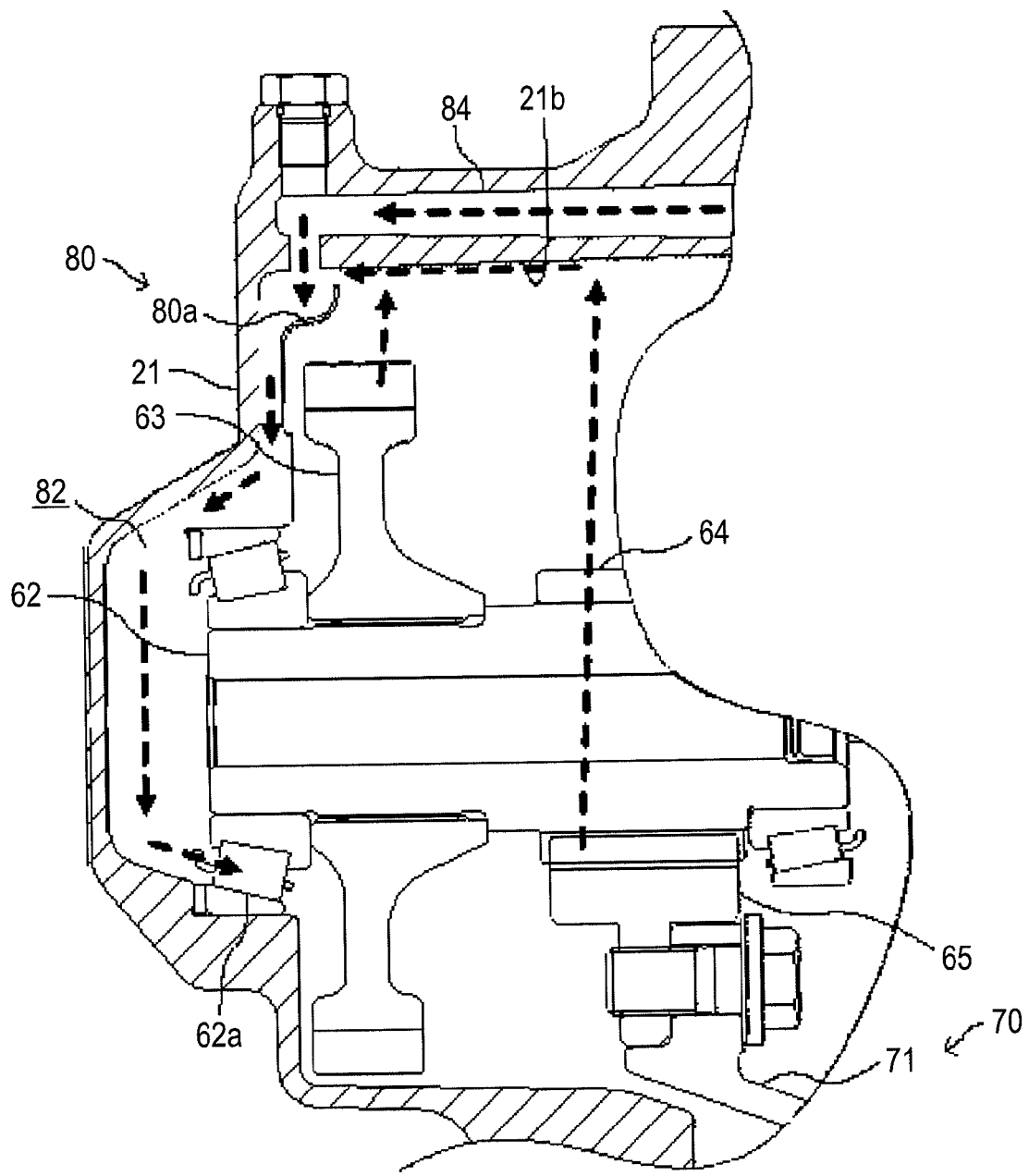
FIG. 3 is a fragmentary sectional view showing an A-A partial cross-section of FIG. 2.

FIG. 2 is an illustration showing a condition of a disposition in the casing 21, FIG. 3 is a fragmentary sectional view showing an A-A partial cross-section of FIG. 2, and FIG. 4 is a fragmentary sectional view showing a B-B partial cross-section of FIG. 2. In FIG. 2, the solid arrows show the rotation directions of the counter driven gear 63 and differential ring gear 65 when travelling forward, and in FIGS. 2 to 4, the dashed arrows show the flows of the lubricating oil. The differential ring gear 65 is disposed in a position in the casing 21 on the lower left side in the drawing in such a way that some of the external teeth thereof are immersed in the lubricating oil accumulated in the accumulation portion 21a (hereafter, this lubricating oil will be referred to as the accumulated oil), as shown in FIG. 2, and rotates clockwise in the drawing when travelling forward. Consequently, when travelling forward, the accumulated oil is scooped upward along the inner wall surface of the casing 21 by the rotation of the differential ring gear 65 (refer to the dashed arrows in the drawing). The inner wall surface of the casing 21 is formed to be approximately smooth in such a way that the accumulated oil is easily scooped upward by the differential ring gear 65. Also, in the example of FIG. 2, the lubricating oil around the counter driven gear 63 is also scooped upward by the rotation of the counter driven gear 63 rotating counterclockwise.

As shown in FIG. 3, a catch tank 80 which, being formed on the upper left side in the drawing (the upper right side in FIG. 2) of the counter driven gear 63 in such a way that a bottom portion 80a declines toward the inner wall surface side (the left side in the drawing) of the casing 21, can temporarily accumulate the lubricating oil, is provided in the casing 21, and on the lower left side in the drawing of the catch tank 80, a clearance (hereafter referred to as an oil passage) 82 which guides the lubricating oil by gravity from the catch tank 80 to a bearing 62a which rotatably supports the counter shaft 62 is formed along the inner wall surface of the casing 21. Consequently, the lubricating oil of the catch tank 80 flows to the left side in FIG. 3, moves by gravity down the oil passage 82, and is supplied to the bearing 62a. The lubricating oil supplied to the bearing 62a further moves downward by gravity, and returns to the accumulation portion 21a (refer to FIG. 2). Also, the catch tank 80 is arranged so that the top, which is a place differing from the oil passage 82 side, opens into the atmosphere. Consequently, when the lubricating oil supplied to the catch tank 80 is large in amount, it happens that one portion of the lubricating oil overspills from the catch tank 80. Furthermore, a portion (hereafter referred to as a ceiling portion) 21b of the casing 21 positioned above the differential ring gear 65 is formed in such a way as to decline toward the catch tank 80 side (the left side in the drawing). Consequently, the lubricating oil which has arrived at the ceiling portion 21b by being scooped up by the differential ring gear 65 and counter driven gear 63, is supplied to the catch tank 80 by moving down the ceiling portion 21b to the catch tank 80 side and dropping by gravity. In addition, as shown in FIGS. 3 and 4, an oil passage 84 which allows communication between a position aligned with the discharge oil passage 33 of the oil pump 30 and a position above the catch tank 80 is formed in the casing 21. Consequently, the leaked hydraulic oil (lubricating oil) discharged through the discharge oil passage 33 is supplied to the catch tank 80 through the oil passage 84. The higher the rotational speed of the externally toothed gear 35 is (the larger the amount of hydraulic oil pumped is), the more the leaked hydraulic oil passing through the oil passage 84.

With the thus configured power transmission device 20 of the embodiment, as the hydraulic oil (lubricating oil) pumped by the oil pump 30 increases when the rotational speed of the engine 12 is high, the lubricating oil accumulated in the accumulation portion 21a decreases (the oil level lowers), and the lubricating oil scooped up by the differential ring gear 65 is likely to decrease, but the leaked hydraulic oil (hereafter referred to as the discharged and supplied oil) discharged through the discharge oil passage 33 of the oil pump 30 and supplied to the catch tank 80 via the oil passage 84 increases. Meanwhile, when the rotational speed of the engine 12 is low, the discharged and supplied oil decreases by an amount by which the hydraulic oil pumped by the oil pump 30 decreases, but the lubricating oil accumulated in the accumulation portion 21a increases (the oil level rises), and the lubricating oil (hereafter referred to as the differential gear scooped arriving oil) arriving at the catch tank 80 via the ceiling portion 21b by being scooped up by the differential ring gear 65 is likely to increase. Consequently, even when either the discharged and supplied oil or the differential gear scooped arriving oil is small in amount, a certain amount of lubricating oil is supplied to the catch tank 80 as a total amount of the discharged and supplied oil, the differential gear scooped arriving oil, and the lubricating oil arriving at the catch tank 80 via the ceiling portion 21b by being scooped up by the counter drive gear 63, meaning that it is possible to prevent the lubricating oil supplied to the bearing 62a from running short. Moreover, as the leaked hydraulic oil (lubricating oil) discharged from the oil pump 30 and guided by the oil passage 84 and the lubricating oil scooped up by the differential ring gear 65 and counter driven gear 63 are once gathered in the catch tank 80, and supplied to the bearing 62a via the oil passage 82, it is possible to simplify the oil passage 82 in comparison with an arrangement wherein oil passages which guide these lubricating oils to the bearing 62a are formed one for each oil. Furthermore, as an arrangement is such that the top of the catch tank 80 opens into the atmosphere, one portion of the lubricating oil overspills from the catch tank 80 when the discharged and supplied oil or scooped arriving oil is large in amount, meaning that it is possible to prevent the lubricating oil from being excessively supplied to the bearing 62a. Moreover, as the leaked hydraulic oil (lubricating oil) discharged from the oil pump 30 is once supplied to the catch tank 80 (whose top opens into the atmosphere) via the oil passage 84, it is possible to prevent the leaked hydraulic oil from being excessively accumulated in the oil passage 84, and it is possible to prevent a large pressure from acting on the oil seal 82 and oil passage 84. In addition, with the configuration of the power transmission device 20 of the embodiment, as the counter driven gear 63 is disposed between the differential ring gear 65 and bearing 62a, it is difficult to directly supply the bearing 62a with the lubricating oil scooped up by the differential ring gear 65, but owing to the existence of the ceiling portion 21b, catch tank 80, and oil passage 82, it is possible to supply the lubricating oil scooped up by the differential ring gear 65 to the bearing 62a via the ceiling portion 21b, catch tank 80, and oil passage 82.

According to the heretofore described power transmission device 20 of the embodiment, as there is provided the catch tank 80, the oil passage 82 which supplies the lubricating oil of the catch tank 80 to the bearing 62a, the ceiling portion 21b which receives the lubricating oil scooped up by the differential ring gear 65 and guides it to the catch tank 80, and the oil passage 84 which guides the leaked hydraulic oil (lubricating oil), discharged from the oil pump 30, to the catch tank 80, it is possible to prevent the lubricating oil supplied to the bearing 62a from running short even when either the lubricating oil arriving at the catch tank 80 via the ceiling portion 21b by being scooped up by the differential ring gear 65, or the leaked hydraulic oil (lubricating oil) discharged from the oil pump 30 and guided to the catch tank 80 by the oil passage 84, is small in amount. Moreover, as the lubricating oil discharged from the oil pump 30 and guided by the oil passage 84 and the lubricating oil scooped up by the differential ring gear 65 are once gathered in the catch tank 80 and then supplied to the bearing 62a via the oil passage 82, it is possible to simplify the oil passage 84 in comparison with an arrangement wherein oil passages are formed one for each of the two oils in such a way that the two oils are guided to the bearing 62a.

Figure 5:
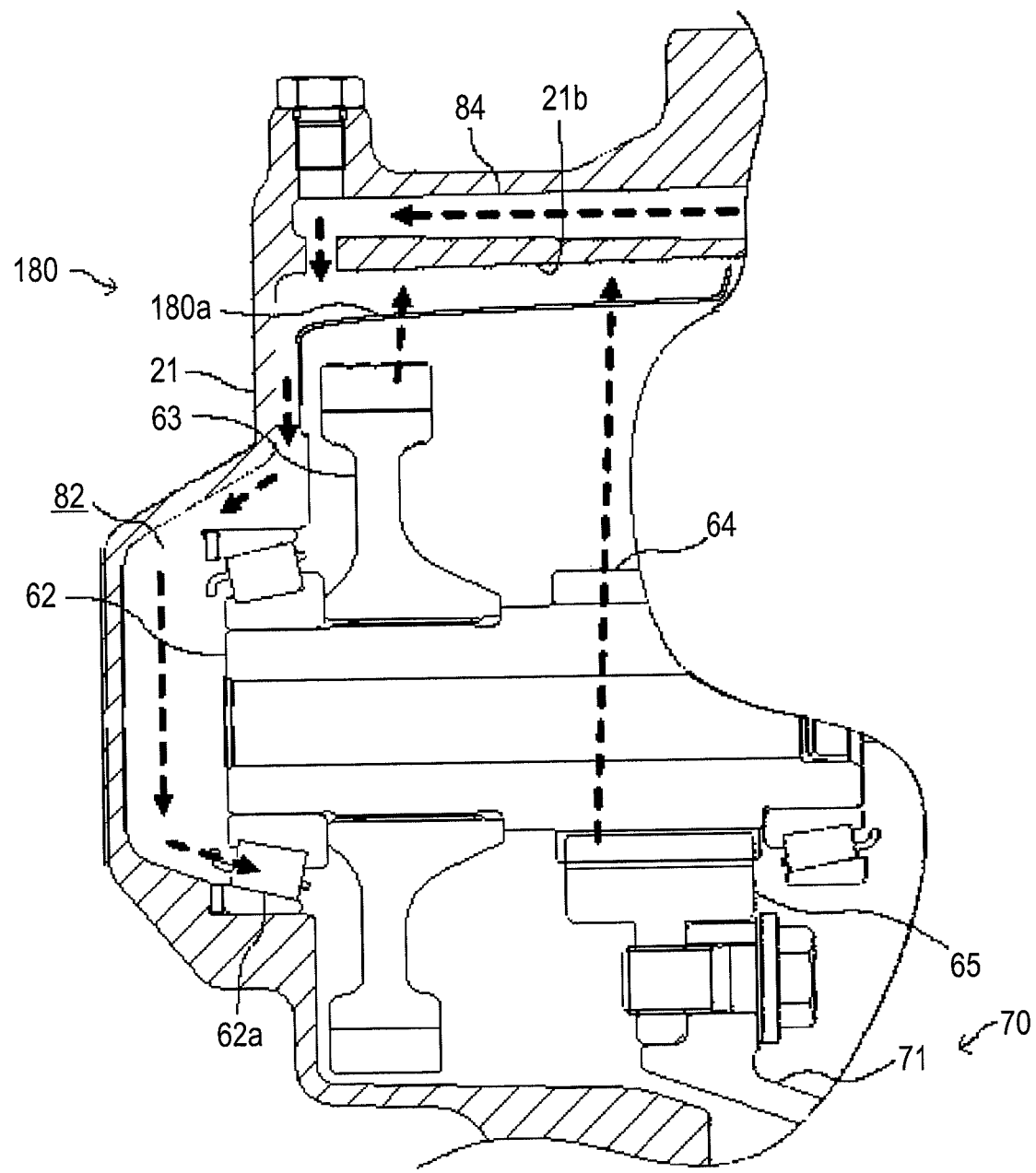
FIG. 5 is an illustration showing one example of a catch tank 180 of a modification example.

With the power transmission device 20 of the embodiment, an arrangement is such that the ceiling portion 21b of the casing 21 is formed in such a way as to decline toward the catch tank 80 side, but an arrangement may be such that, in addition to or in place of this, a catch tank is formed in such a way as to be able to receive the lubricating oil scooped up by the differential ring gear 65. In this case, an arrangement may be such that a bottom portion 180a of a catch tank 180 is formed to have a width such as to be able to receive the lubricating oil scooped up by the differential ring gear 65, as illustrated in FIG. 5.

With the power transmission device 20 of the embodiment, an arrangement is such that the leaked hydraulic oil (lubricating oil) discharged from the oil pump 30 and guided by the oil passage 84 and the lubricating oil scooped up by the differential ring gear 65 and counter driven gear 63 are once gathered in the catch tank 80, but an arrangement may be such that the lubricating oil scooped up by the counter driven gear 63 is not gathered in the catch tank 80.

With the power transmission device 20 of the embodiment, an arrangement is such that the catch tank 80 and the oil passage 82 (the clearance formed along the inner wall surface of the casing 21) are formed separately, but an arrangement may be such that they are integrally formed.

With the power transmission device 20 of the embodiment, an arrangement is such that the lubricating oil of the catch tank 80 is supplied to the bearing 62a via the oil passage 82, but an arrangement may be such that the lubricating oil is supplied to not only the bearing 62a, but any member (lubrication target) such as a bearing other than the bearing 62a, any gear, or any shaft.

With the power transmission device 20 of the embodiment, an arrangement is such that it includes the four-speed automatic transmission 40 which can switch between the forward first speed to fourth speed, reverse, and neutral, but it being sufficient to include a hydraulic transmission, an arrangement may be such as to include a transmission with any number of speeds such as five speeds, six speeds, or eight speeds, and an arrangement may be such as to include a continuously variable transmission.

A description will be given of a correspondence relationship between the main elements of the embodiment and the main elements of the invention described in the section of the disclosure of the invention. In the embodiment, the automatic transmission 40 corresponds to a "transmission", the accumulation portion 21a of the casing 21 to an "accumulation portion", the oil pump 30 to a "pressure pump", the gear mechanism 60 having the differential ring gear 65a to a "gear mechanism", the ceiling portion 21b of the casing 21, the catch tank 80, and the oil passage 82 to a "reception and guide portion", and the oil passage 84 to a "leaked hydraulic oil guide portion".

As the correspondence relationship between the main elements of the embodiment and the main elements of the invention described in the section of the disclosure of the invention is one example for the embodiment to specifically describe the mode for carrying out the invention described in the section of the disclosure of the invention, it does not limit the elements of the invention described in the section of the disclosure of the invention. That is, the interpretation of the invention described in the section of the disclosure of the invention should be made based on the description of the section, and the embodiment is only one specific example of the invention described in the section of the disclosure of the invention.

A description has heretofore been given, using the embodiment, of the mode for carrying out the invention but, the invention not being limited to this kind of embodiment in any way, it goes without saying that the invention can be carried out in various modes without departing from the scope thereof.

The invention can be utilized by a power transmission device manufacturing industry and the like.

What is claimed is:

1. A power transmission device which, as well as being mounted in a vehicle, is housed in a casing, and includes a hydraulic transmission which transmits power from a motor to an axle, comprising:
   an accumulation portion which accumulates lubricating oil;
   a pressure pump which is driven by the motor to pump the lubricating oil accumulated in the accumulation portion to the transmission as hydraulic oil of the transmission;
   a scooping gear which scoops up the lubricating oil accumulated in the accumulation portion while rotating;
   a reception and guide portion which receives the lubricating oil scooped up by the scooping gear and guides it to a predetermined lubrication target; and
   a leaked hydraulic oil guide portion which guides leaked hydraulic oil, leaking when the hydraulic oil is pumped from the pressure pump, to the reception and guide portion.

2. The power transmission device according to claim 1, wherein
   a place of the reception and guide portion differing from a place which guides the leaked hydraulic oil to the predetermined lubrication target opens into the atmosphere.

3. The power transmission device according to claim 2, wherein
   the reception and guide portion has a main body which temporarily accumulates the lubricating oil, an introduction portion which introduces the lubricating oil scooped up by the scooping gear to the main body, and a lubrication guide portion which guides the lubricating oil of the main body to the predetermined lubrication target.

4. The power transmission device according to claim 3, wherein
   the introduction portion is formed in such a way as to decline toward the main body side.

5. The power transmission device according to claim 4, wherein
   a shield is disposed between the scooping gear and predetermined lubrication target.

6. The power transmission device according to claim 5, wherein
   the shield is a counter driven gear which, being attached to a counter shaft, meshes with a counter drive gear attached to an output shaft of the transmission,
   the scooping gear is a differential ring gear which, as well as meshing with a differential pinion gear attached to the counter shaft, is linked to a differential mechanism connected to the axle, and the predetermined lubrication target is a bearing which rotatably supports the counter shaft.

7. The power transmission device according to claim 6, wherein the main body is disposed on the side opposite to the differential ring gear across the counter driven gear, and the lubrication guide portion is formed along an inner wall surface of the casing.

8. The power transmission device according to claim 1, wherein the reception and guide portion has a main body which temporarily accumulates the lubricating oil, an introduction portion which introduces the lubricating oil scooped up by the scooping gear to the main body, and a lubrication guide portion which guides the lubricating oil of the main body to the predetermined lubrication target.

9. The power transmission device according to claim 8, wherein the introduction portion is formed in such a way as to decline toward the main body side.

10. The power transmission device according to claim 8, wherein a shield is disposed between the scooping gear and predetermined lubrication target.

11. The power transmission device according to claim 10, wherein the shield is a counter driven gear which, being attached to a counter shaft, meshes with a counter drive gear attached to an output shaft of the transmission, the scooping gear is a differential ring gear which, as well as meshing with a differential pinion gear attached to the counter shaft, is linked to a differential mechanism connected to the axle, and the predetermined lubrication target is a bearing which rotatably supports the counter shaft.

12. The power transmission device according to claim 11, wherein the main body is disposed on the side opposite to the differential ring gear across the counter driven gear, and the lubrication guide portion is formed along an inner wall surface of the casing.

* * * * *